(12) United States Patent
Lee et al.

(10) Patent No.: US 6,556,415 B1
(45) Date of Patent: Apr. 29, 2003

(54) TUNABLE/VARIABLE PASSIVE MICROELECTRONIC COMPONENTS

(75) Inventors: Cheng-Hong Lee, Shinjuang (TW); Hsin-Li Lee, Hsinchu (TW)

(73) Assignee: Industrial Technologies Research Institute, Hsin Chu (TW)

( * ) Notice: Subject to any disclaimer, the term of this patent is extended or adjusted under 35 U.S.C. 154(b) by 0 days.

(21) Appl. No.: 10/184,818

(22) Filed: Jun. 28, 2002

(51) Int. Cl.⁷ .................................................. H01G 4/06
(52) U.S. Cl. ....................................... 361/277; 361/311
(58) Field of Search ................................. 361/311, 312, 361/313, 277, 278, 287, 290, 292, 296

(56) References Cited

U.S. PATENT DOCUMENTS 3,880,493 A  * 4/1975  Lockhart, Jr. ................ 439/525
3,947,934 A  * 4/1976  Olson ........................ 29/25.42
5,375,033 A  * 12/1994  MacDonald ................ 361/281
6,308,573 B1 * 10/2001  Lee et al. ..................... 73/652

* cited by examiner

Primary Examiner—Anthony Dinkins
(74) Attorney, Agent, or Firm—Tung & Associates

(57) ABSTRACT

A tunable microelectronic capacitor and a tunable microelectronic inductor, each utilizing a micro-actuator fabricated by MEMS technique as a major component in the capacitor, the micro-actuator drives a dielectric plate in between to electrode plates to vary the capacitance. In the inductor, the micro-actuator drives a cantilever beam member made of a magnetic material into an inductor coil for changing the inductance of the coil.

8 Claims, 1 Drawing Sheet

TUNABLE/VARIABLE PASSIVE MICROELECTRONIC COMPONENTS

FIELD OF THE INVENTION

The present invention generally relates to microelectronic components and more particularly, relates to a microelectronic tunable/variable passive component of capacitor or inductor operated by a micro-actuator fabricated by micro-electro-mechanical-system (MEMS) technology.

BACKGROUND OF THE INVENTION

Miniaturization of motors, actuators and similar machine parts is receiving increasing attention because of the new uses of these devices made possible due to of their small size. Additionally, these devices can be manufactured in large quantities at low piece-part cost. Current designs of miniaturized machine parts can be categorized according to size or scale. Macroscopic machine parts have a length in the range of approximately 1 to 10 inches, while microscopic machine parts, sometimes referred to as MEMS (Micro-Electro-Mechanical-Systems) have a length in the range of 0.01 to 1 inch.

In any event, existing miniaturized actuators and motors of both macroscopic or microscopic size are essentially replicas of larger motors, and thus include such component parts as windings, stators, gears, transmission links, etc. These miniaturized parts must be assembled with high precision in order to produce an operable device providing the desired function, e.g. movement of an electrically activated component that then mechanically engages other parts to induce motion. Depending upon the engagement configuration, this motion may be linear in any of several axes, rotary, circular, etc. Because of the number of complex parts that must be assembled with a high degree of precision, the yields of parts meeting target specifications and performance are relatively low using current manufacturing processes. These low yields in turn increase the cost of the parts. Accordingly, it would be desirable to provide a new form of actuator and related method for inducing movement of an object on a microscopic or macroscopic scale which eliminates the problems mentioned above.

The MEMS technology has recently been extended to the semiconductor fabrication industry. In the present state of the art, a semiconductor device is normally formed in a planar structure and therefore the process for fabricating the semiconductor device is generally a planar process. For instance, layers of different materials, i.e. such as insulating materials and metallic conducting materials, are deposited on top of one another and then features of the device are etched through the various layers. The planar fabrication process, while adequate in fabricating most semiconductor elements and devices, is not suitable for fabricating certain devices that are 3-dimensional in nature. For instance, a 3-D solenoid, i.e. or a 3-D inductor coil, must be fabricated by stacking a large number of layers from the bottom to the top and therefore, requires a large number of photomasks to complete the task. For instance, when CMOS technology is used in forming such 3-D solenoid, at least four other steps utilizing photomasks must be incorporated in order to complete the fabrication process. Moreover, the precise alignment between the layers is necessary in order to avoid a variety of processing difficulties occurring at the interfaces.

In recent years, there have been great advances in the application of semiconductor fabrication technology applied to the wireless communication industry. In wireless communication, the use of a microelectronic capacitor or a microelectronic tunable capacitor is an important aspect of the technology. For instance, tunable matching networks, electronically tunable filters and voltage-controlled oscillators have been widely used in microwave communications. To be successfully used in such applications, a tunable capacitor must have a high Q-factor and a wide adjustable range. The wide adjustable range not only provides the necessary frequency range, but also compensates process or temperature induced variations.

Tunable capacitors fabricated by the presently available semiconductor fabrication technology are able to meet the high Q-factor, however, the available tunable range and the possibility of process integration with the standard IC fabrication process are less than desirable. While efforts have been made in designing tunable capacitors by changing the distance between two capacitor plates, the design has many limitations. Among them, the pull-in effect greatly limits the tunable range of the capacitance. In another design that utilizes comb drive-type actuators by changing the overlapped area between two parallel capacitor plates, the amount of displacement between the two parallel plates is limited and thus, impossible to produce the desirable tunable range.

Another limitation imposed by the planar processing technology is that only a square or rectangular-shaped 3-D solenoid can be fabricated. A 3-D solenoid of circular shape cannot be fabricated by such technology. In order to raise a 3-D solenoid from a semiconductor substrate, very thick photoresist layers and electroplating techniques for filling large aspect ratio structures must also be utilized, which further increases the complexity of the fabrication process.

3-D solenoids or inductor coils have been widely used in radial frequency (RF) communication technologies. It is especially critical for RF passive telecommunication devices which require high quality factor inductors. For instance, such high quality factor inductors include those utilized in RF filters or RF oscillators. Presently, RF telecommunication devices utilize inductor coils that are planar inductor coils which produces a magnetic field that is perpendicular to the device substrate. As a result, induced currents are produced in a silicon substrate, thus causing significant energy loss, and consequently, leading to a low quality factor. This drawback prevents the use of such devices at even higher radio frequencies. For instance, presently fabricated components for telecommunication equipment such as passive elements of inductor coils, capacitors and resistors cannot be fabricated on the same silicon substrate with the active elements. Instead, such passive elements are assembled together with the active elements on a circuit board producing a circuit board of very large area to accommodate the passive elements.

In a copending application, assigned to the common assignee of the present invention, a method for fabricating a microelectronic tunable capacitor by MEMS technology that is compatible with a CMOS process is disclosed. In another copending application, assigned to the common assignee of the present invention, a method for fabricating a 3-dimensional solenoid inductor by the MEMS technique is disclosed. The entire disclosures of the two copending applications is hereby incorporated by reference in their entireties.

It is therefore an object of the present invention to provide a tunable microelectronic capacitor or inductor that does not have the drawbacks or shortcomings of the conventional capacitors and inductors.

It is another object of the present invention to provide a tunable microelectronic capacitor incorporates a comb drive actuator fabricated by MEMS technique.

It is a further object of the present invention to provide a tunable microelectronic capacitor by driving a dielectric plate attached to a comb drive actuator into and out of a pair of parallel plate electrodes.

It is another further object of the present invention to provide a tunable microelectronic capacitor in which the capacitance can be changed by changing the overlapped area between a horizontal dielectric plate and a pair of electrodes.

It is still another object of the present invention to provide a tunable microelectronic capacitor in which the capacitance can be changed by altering the dielectric constant of the dielectric plate inserted into a pair of electrodes.

It is yet another object of the present invention to provide a tunable microelectronic inductor by moving a magnetic cantilever beam attached to a comb drive actuator into/out of an inductor coil.

SUMMARY OF THE INVENTION

In accordance with the present invention, a tunable microelectronic capacitor and a tunable microelectronic inductor are provided.

In a preferred embodiment, a tunable microelectronic capacitor is provided which includes a pre-processed semiconductor substrate; a micro-actuator constructed of two opposing sections supported on the pre-processed semiconductor substrate, one of the two opposing sections has attached thereon a horizontal plate member formed of a dielectric material extending outwardly away from the micro-actuator; and a pair of electrode plates supported on the pre-processed semiconductor substrate and are parallelly positioned spaced-apart from each other for receiving the horizontal plate member formed of the dielectric material there in-between.

In the tunable microelectronic capacitor, the micro-actuator is a comb drive actuator. The horizontal plate member may be formed of a dielectric material selected from the group consisting of silicon oxide, aluminum oxide, silicon nitride, silicon oxynitride and silicon carbide. The tunable microelectronic capacitor has a capacitance represented by $C=k\in_o A/d$, whereas K is the dielectric constant of the dielectric material, $\in_o$ is the capacitance coefficient in vacuum, A is the area of the parallel electrode plates, d is the distance between the two parallel electrode plates. The dielectric material utilized in forming the horizontal plate member may have a dielectric constant larger than 2. The capacitor may have a capacitance tunable by changing the overlapped area between the horizontal plate member and the pair of electrode plates. A capacitance of the capacitor can be increased by increasing the dielectric constant of the horizontal plate member, or may be decreased by decreasing the dielectric constant of the horizontal plate member.

The present invention is further directed to a tunable microelectronic inductor which includes a pre-processed microelectronic substrate; a micro-actuator formed of two opposing sections on top of the pre-processed microelectronic substrate; a cantilever beam member formed of a magnetic material attached to one of the two opposing sections extending outwardly away from the micro-actuator; and an inductor coil that has a cavity therein for receiving the cantilever beam member, and two free ends each in electrical communication with one of a pair of electrodes formed on top of the pre-processed microelectronic substrate.

In the tunable microelectronic inductor, the cantilever beam member may be formed in a magnetic plate or in a magnetic cylinder. The cantilever beam member may be formed of a magnetic material that has a stiffness at least that of sintered steel. The micro-actuator may be a comb drive actuator. The microelectronic inductor may have an inductance tunable by changing the overlapped length between the cantilever beam member and the inductor coil. The inductance of the microelectronic inductor may be increased by increasing the overlapped length between the cantilever beam member and the inductor coil, or may be decreased by decreasing the overlapped length between the cantilever beam member and the inductor coil. The microelectronic inductor has an inductance which can be calculated by $L=\mu N^2 A/l$, wherein $\mu$ is the permeability of the magnetic material, N is the number of turns of the coil, A is the cross-sectional area of the inductor, l is the length of the cantilever beam member.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The present invention discloses a tunable microelectronic capacitor and a tunable microelectronic inductor that utilizes a micro-actuator for actuating the capacitor or the inductor. The micro-actuator can be fabricated by a MEMS technique and can be formed of two opposing sections in a comb drive actuator. The two opposing sections are each supported on a pre-processed semiconductor substrate. One of the two opposing sections has attached thereon a horizontal plate member that is formed of a dielectric material extending outwardly away from the micro-actuator. The tunable microelectronic capacitor further includes a pair of electrode plates that are supported on the pre-processed semiconductor substrate and are parallelly positioned at a pre-determined space apart from each other for receiving the horizontal plate member formed of the dielectric material there-in-between. The micro-actuator may also be provided in forms other than a comb drive actuator, as long as it can be fabricated readily by a MEMS technique.

In a preferred embodiment, the horizontal plate member that extends into the space in between a pair of electrode plates can be formed of a suitable dielectric material that has a dielectric constant larger than 2. For instance, it can be fabricated of silicon oxide which has a dielectric constant of 4, or by aluminum oxide which has a dielectric constant of 9. Other dielectric materials having a dielectric constant larger than 2, i.e., silicon nitride, silicon oxynitride and silicon carbide may also be suitably used in the present invention.

Figure 1:
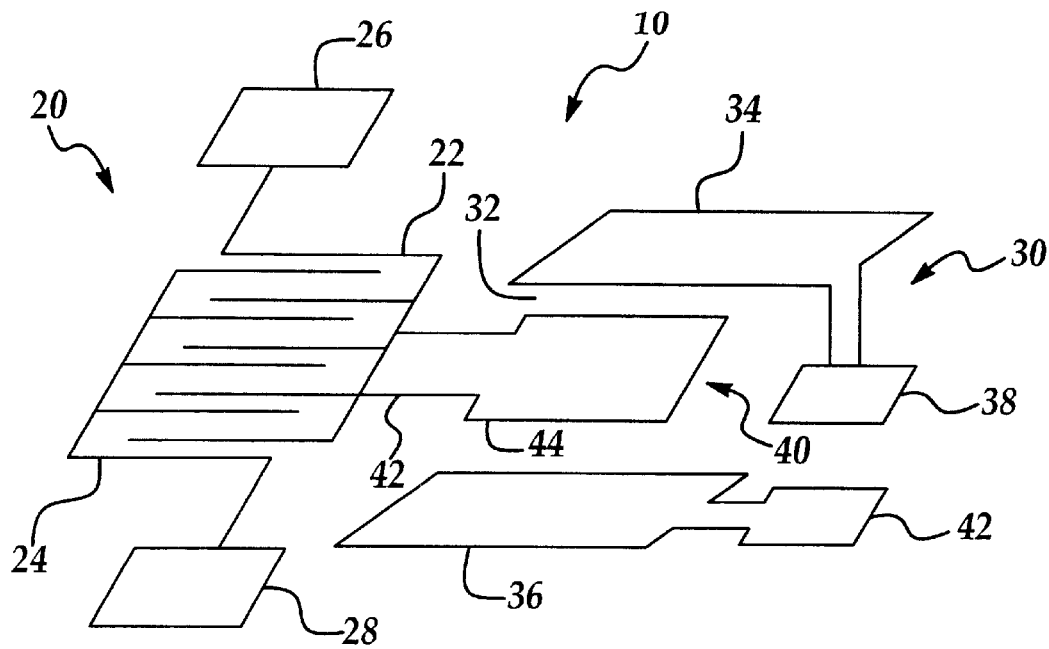
FIG. 1 is a perspective view of the present invention tunable microelectronic capacitor.

Referring initially to FIG. 1, wherein a perspective view of a present invention tunable microelectronic capacitor 10 is shown. The tunable microelectronic capacitor 10 is formed by two major components of a micro-actuator 20 and a parallel capacitor 30. The micro-actuator 20, shown in FIG. 1, is of the comb drive type actuator that is constructed by two opposing sections 22, 24. Each of the opposing sections 22, 24 is connected to an electrode 26, 28, respectively. By controlling the current flown into the electrodes 26, 28, the micro-actuator can be actuated to move horizontally, a horizontal plate member 40. The horizontal plate member 40 is formed of a cantilever beam 42 and a dielectric plate 44. The material for forming the cantilever beam 42 may be a dielectric material or may be any other material that has high stiffness. The movement of the micro-actuator 20 allows a movement of the dielectric plate 44 into or out of the spacing 32 formed in between the two parallel electrode plates 34, 36. Each one of the two electrode plates 34, 36 is in electrical communication with an electrode 38, 42, respectively.

In the configuration shown in FIG. 1, the capacitance of the present invention tunable microelectronic capacitor 10 can be controlled by the degree of extension of the dielectric plate 44 into the spacing 32 between the pair of electrode plates 34, 36. The capacitance can be advantageously calculated by the equation:

$$C = k \in_0 A/d$$

wherein C is the capacitance,

K is the dielectric constant of the dielectric plate, $\in_0$ is the capacitance coefficient in vacuum, A is the area of the parallel electrode plates, and d is the distance between the parallel electrode plates.

As shown in FIG. 1, the capacitance of the present invention tunable microelectronic capacitor can be changed by changing the overlapped area between the horizontal plate member, i.e., the dielectric plate 44 and the pair of electrode plates 34, 36. Moreover, the capacitance of the present invention tunable microelectronic capacitor 10 can be increased by increasing the dielectric constant of the dielectric plate 44 of the horizontal plate member 40. Similarly, the capacitance of the present invention capacitor 10 can be decreased by decreasing the dielectric constant of the dielectric plate 44 of the horizontal plate member 40.

Figure 2:
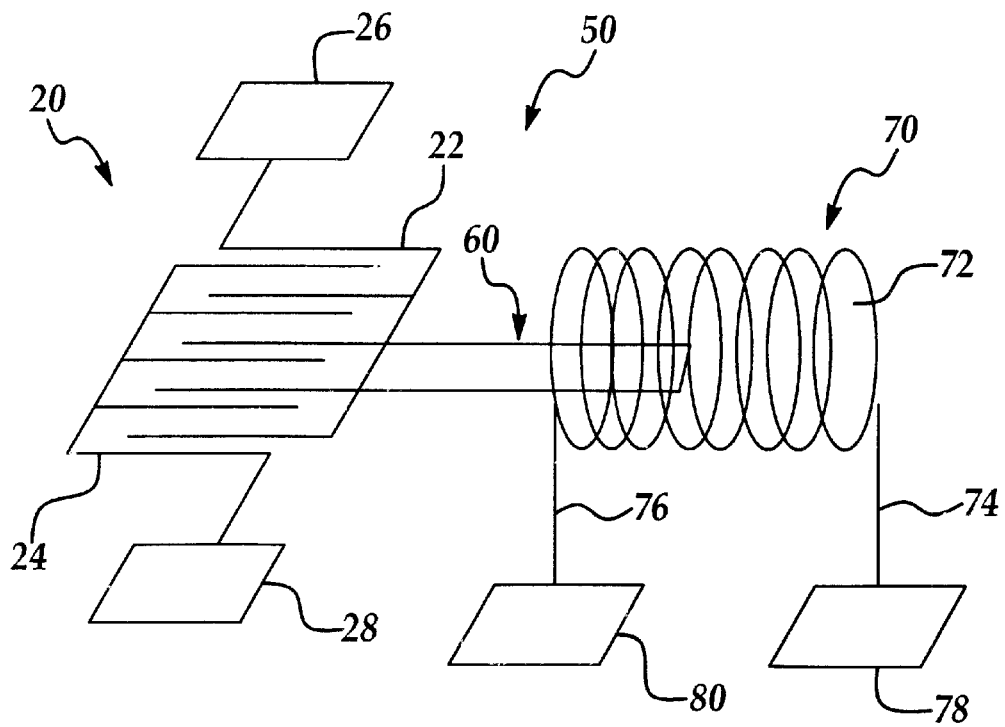
FIG. 2 is a perspective view of the present invention tunable microelectronic inductor.

In another preferred embodiment, the present invention further provides a tunable microelectronic inductor 50, as shown in FIG. 2. The tunable microelectronic inductor 50 is constructed by two major components of a micro-actuator 20, similar to that shown in FIG. 1, however, with a different cantilever beam 60 which is formed of a magnetic material.

The tunable microelectronic inductor 50 is constructed by a pre-processed microelectronic substrate (not shown), a micro-actuator 20 which is formed of two opposing sections 22, 24 on top of the pre-processed microelectronic substrate; a cantilever beam member 60 that is formed of a magnetic material attached to one opposing section 22 of the micro-actuator 20 extending outwardly away from the micro-actuator 20. The tunable microelectronic inductor 50 further includes an inductor coil 70 which has a cavity 72 therein for receiving the cantilever beam member 60. The inductor coil 70 further having two free ends 74, 76 each in electrical communication with one of a pair of electrodes 78, 80 that are formed on top of the pre-processed microelectronic substrate.

The cantilever beam member 60 may be formed in a magnetic plate or in a magnetic cylinder. The cantilever beam member 60 may also be formed of a magnetic material that has a stiffness at least that of sintered steel. The inductor coil 72 is a three dimensional solenoid inductor which is activated by the magnetic cantilever beam 60 which may be fabricated of a sintered metal, such as sintered iron. The cantilever beam 60 may also be fabricated of other high stiffness material. When actuated by the micro-actuator 20, the cantilever beam member 60 extends into the cavity 72 of the inductor coil 70 to change the inductance of the inductor coil 70.

The inductance of the inductor coil 70 can be advantageously calculated by:

$$L = \mu N^2 A/l$$

wherein A is the permeability of the magnetic material, i.e., the sintered iron, N is the number of turns of the inductor coil, A is the cross-sectional area of the inductor coil, and l is the length of the cantilever beam member.

As shown in FIG. 2, the present invention microelectronic inductor 50 produces an inductance that is tunable by changing the overlapped length between the cantilever beam member 60 and the inductor coil 70. The inductance can be increased by increasing the overlapped length between the cantilever beam member 60 and the inductor coil 70, or the inductance can be decreased by decreasing the overlapped length between the cantilever beam 60 and the inductor coil 70.

The present invention tunable microelectronic capacitor and inductor have therefore been amply described in the above description and in the appended drawings of FIGS. 1 and 2.

While the present invention has been described in an illustrative manner, it should be understood that the terminology used is intended to be in a nature of words of description rather than of limitation.

Furthermore, while the present invention has been described in terms of two preferred embodiments, it is to be appreciated that those skilled in the art will readily apply these teachings to other possible variations of the inventions.

The embodiment of the invention in which an exclusive property or privilege is claimed are defined as follows.

What is claimed is:

1. A tunable microelectronic capacitor comprising:

a pre-processed semiconductor substrate;

a micro-actuator constructed of two opposing sections supported on said pre-processed semiconductor substrate, one of said two opposing sections having attached thereon a horizontal plate member formed of a dielectric material extending outwardly away from said micro-actuator; and a pair of electrode plates supported on said pre-processed semiconductor substrate and are parallelly positioned spaced-apart from each other for receiving said horizontal plate member formed of said dielectric material there-in-between.

2. A tunable microelectronic capacitor according to claim 1, wherein said micro-actuator is a comb drive actuator.

3. A tunable microelectronic capacitor according to claim 1, wherein said horizontal plate member is formed of a dielectric material selected from the group consisting of silicon oxide, aluminum oxide, silicon nitride, silicon oxynitride and silicon carbide.

4. A tunable microelectronic capacitor according to claim 1, wherein said capacitor has a capacitance of $C = k \in_0 A/d$, k is the dielectric constant of the dielectric material, $\in_0$ is the capacitance coefficient in vacuum, A is the area of the parallel electrode plates, d is the distance between the parallel electrode plates.

5. A tunable microelectronic capacitor according to claim 1, wherein said dielectric material having a dielectric constant larger than 2.

6. A tunable microelectronic capacitor according to claim 1, wherein said capacitor having a capacitance tunable by changing the overlapped area between said horizontal plate member and said pair of electrode plates.

7. A tunable microelectronic capacitor according to claim 1, wherein a capacitance of said capacitor can be increased by increasing the dielectric constant of said horizontal plate member.

8. A tunable microelectronic capacitor according to claim 1, wherein a capacitance of said capacitor can be decreased by decreasing the dielectric constant of said horizontal plate member.

* * * * *